Oct. 15, 1929.  A. F. GILLET  1,731,850
ANTISKID CHAIN
Filed Dec. 10, 1928

Inventor
A.F.Gillet
By Arthur H. Sturges
Attorney

Patented Oct. 15, 1929

1,731,850

UNITED STATES PATENT OFFICE

ALEXIS F. GILLET, OF OMAHA, NEBRASKA, ASSIGNOR TO THE JUBILEE MANUFACTURING COMPANY, OF OMAHA, NEBRASKA, A CORPORATION OF NEBRASKA

ANTISKID CHAIN

Application filed December 10, 1928. Serial No. 324,862.

The present invention relates to anti-skid tire chains, and more particularly to the type known as cross chains.

An object of the invention is to provide an anti-skid cross chain for tires, which may be quickly and easily applied and removed, and which when in position will remain upon the wheel, and wherein the tension of the chain is utilized by a peculiar construction for holding the chain firmly in place and from accidental displacement.

Another object of the invention is to provide an anti-skid cross chain for tires embodying the above features and which is provided with locking or securing means so positioned upon the chain structure that it may be placed at the outer side of the wheel and near the felly, so that easy access may be had to the attachment for locking it in position and for releasing it when it is desired to remove the chain.

A still further object of the invention is to provide a construction of anti-skid cross chain, which when in position is held from turning about the tire and from sliding across the felly of the wheel, and which is provided with connecting means between the locking device and the free end of the cross chain for admitting of the quick and easy connection and removal of the free end of the chain with respect to the locking means, such connections being disposed near the felly of the wheel and remote from the tread of the tire, so that the coupling and operating devices are disposed above the surface of the roadway, and consequently above the mud, sand and the like in which the tire may be embedded.

With the foregoing and other objects in view, the invention will be more fully described hereinafter, and will be more particularly pointed out in the claims appended hereto.

Figure 1:
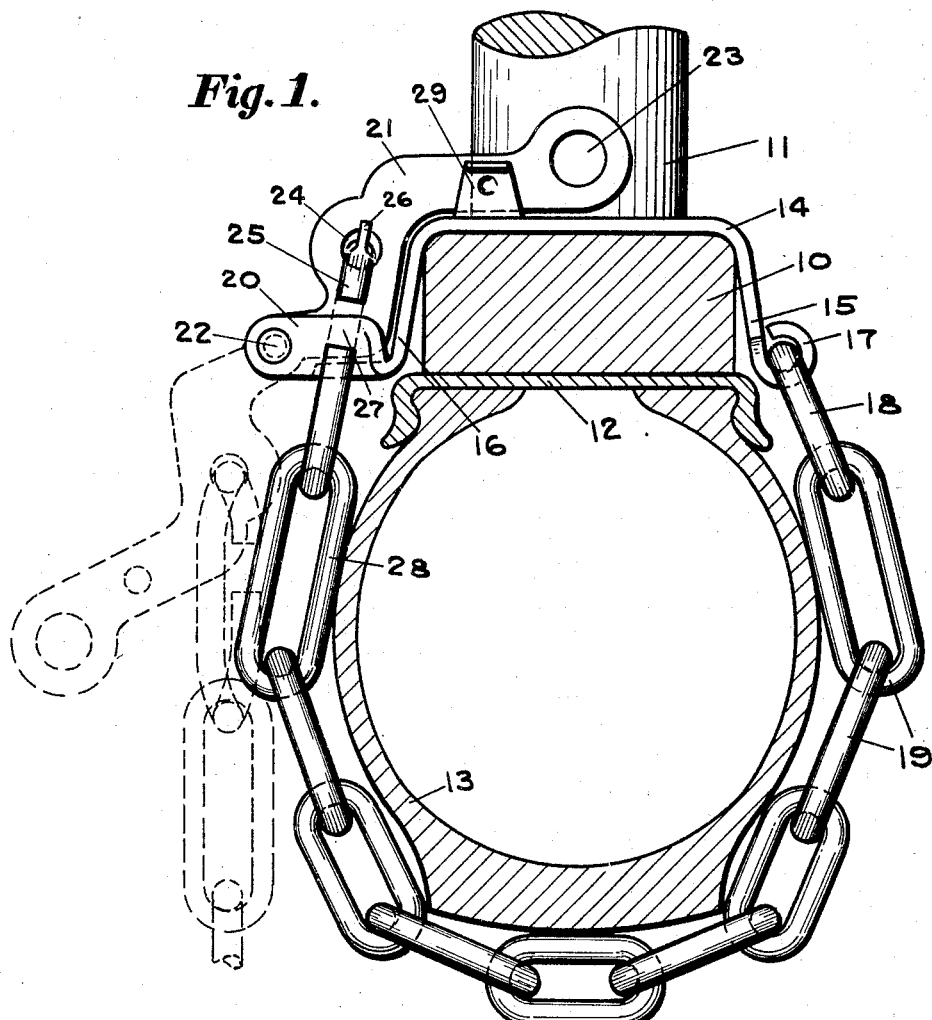
Figure 2:
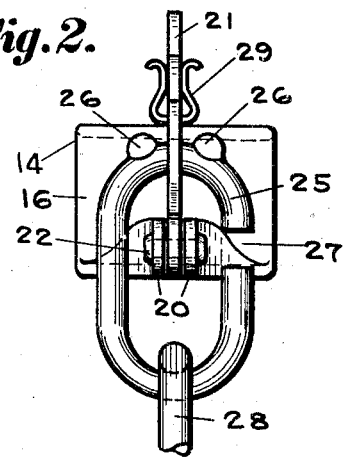

In the drawings, wherein like symbols refer to like or corresponding parts throughout the several views, Figure 1 is a transverse section taken through a portion of the tire as applied to a wheel and having an anti-skid device constructed according to this invention applied thereto, the dotted lines showing the device in released position, and Figure 2 is a fragmentary outer side elevation of the device removed from the wheel and tire and showing the retaining means in locked position.

Referring to the drawing, the wheel is shown fragmentarily as a felly 10, spoke 11 and a rim 12. These parts are shown of conventional form and are no part of this invention, the rim 12 carrying a tire 13 of any desired construction.

The anti-skid cross chain device of this invention comprises a saddle plate 14 of any suitable width adapted to extend between adjacent spokes 11 and across the inner face of the felly 10. The saddle plate 14 is provided with arms 15 and 16, which are bent outwardly from the intermediate portion of the plate 14, and which lie at opposite sides or edges of the felly 10 to hold the saddle plate from sliding transversely across the felly.

The arm 15 terminates adjacent to and preferably inwardly of the rim 12 and may be reduced and rolled over to provide an eye 17 in which is pivotally and permanently connected the inner link 18 of the cross chain 19. The chain 19 is made up of a plurality of links of any desired length and shape and in the present instance straight links are shown which are of reduced length at the tread portion of the tire, and are of increasing length at the opposite sides of the tire 13. This, however, may be varied as is found necessary and convenient. The arm 16 of the saddle plate 14, which may be termed the outer arm, is of substantially the same length as that of the arm 15, but is provided with a pair of outwardly extending ears 20, which may be stamped from the free end of the arm 16, and bent or twisted at substantially right angles to provide a pair of spaced flat ears for pivotally supporting therebetween the inner end of a locking lever 21. The locking lever 21 is mounted at its inner end on a pivot 22, which extends through the ears 20, the pivot 22 being located near the outer ends of the ears remote from the arm 16, while the locking lever is provided with an angular heel portion, which lies substantially in parallel relation between the ears 20, and extends upwardly along the outer side of the arm 16 for displacing the intermediate portion of the locking lever 21 inwardly toward the felly 10 from the pivot 22.

The free end of the locking lever 21 is curved inwardly across the saddle plate 14 and extends to any desired extent. The free extremity of the locking lever 21 is enlarged and apertured to provide a handle 23 for engagement by the hand or by a suitable implement, which may be passed through the opening in the handle for the purpose of swinging the locking lever 21 outwardly from the saddle plate 14. The intermediate portion of the locking lever 21 is provided with an opening 24 forming a bearing through which engages one end of a connecting link 25. The said end of the link 25 is freely rotatable and slidable in the opening 24 of the locking lever, and is retained in engagement therewith by stop projections or lugs 26, which are preferably swaged upwardly from the body of the link 25 at opposite sides of the locking lever 21. The link 25 is open at one side, as shown at 27 and the free end of the link 25 provides a hook, which is normally open, but which is blocked by the ears 20 when the connecting or coupling link 25 is raised in the closed position, such as shown in Figures 1 and 2.

The link 25, being connected to the intermediate portion of the locking lever 21 is swung inwardly beyond the pivot 22 when in securing position, so that pressure on the link 25 outwardly toward the tread of the tire results in the binding and retention of the locking lever 21 in its closed position.

The coupling or connecting link 25 is adapted to receive in its free hook portion the outer end link 28 of the cross chain 19. The coupling and removal of the link 28 with respect to the coupling link 25 is effected only when the locking lever 21 is swung outwardly into the dotted line position shown in Figure 1. This swinging of the locking lever 21 into an outward position releases the tension on the cross chain 19 and carries the connecting or coupling link 25 away from the ears 20, so that the link 28 may be quickly and easily engaged with the hook of the link 25 or removed therefrom.

While the pressure exerted upon the cross chain 19 is sufficient in holding the locking lever 21 in locked position, as shown in Figure 1, additional means may be provided for holding the locking lever in its locked position. This additional means is a spring clip 29, which is secured upon the inner face of the saddle plate 14 preferably near the arm 16 and which is provided with spring arms arranged to frictionally engage the opposite sides of the locking lever 21 and hold it frictionally against movement away from the saddle plate.

From the above description it is evident that to apply the device it is only necessary to place the saddle plate 14 in position on the felly and draw the cross chain 19 around the tread of the tire 13. The locking lever 21 is now swung outwardly into the dotted line position shown in Figure 1 when the free link 28 of the cross chain may be hooked in the coupling link 25.

The locking lever 21 is now swung backwardly and inwardly to carry the coupling link 25 inwardly over the ears 20 and backwardly of the pivot 22 thereof, so that the pressure exerted against the cross chain is utilized in holding the locking lever 21 seated against the saddle plate 14 and the outer arm 16 thereof. The locking lever 21 as it is swung inwardly, engages between the arms of the clip 29 and the clip thus grips the locking lever and holds it against vibration or accidental displacement. It will also be noted that the structure and location of the locking lever 21 is such that jolts or shock imparted to the wheel in any manner will only tend to more firmly seat the locking lever in closed position, and the rapid turning of the wheel will only result in a centrifugal thrust which will further tend to maintain the lever locked.

While I have shown and described the preferred embodiment of the invention, I do not desire it to be understood as limiting myself to the precise details of construction herein shown and delineated, as modifications and minor changes may be made within the scope of the appended claims.

What is claimed is:—

1. In an anti-skid tire chain comprising, a saddle plate adapted to fit across the felly and having out-turned arms adapted to lie against the opposite edges of the felly, and a tire chain pivotally connected to one of said arms and adapted to engage about a tire on the felly, means for connecting the free end of the tire chain to the saddle plate comprising outwardly extending elongated ears on the other of said arms, a locking lever having an angle heel portion extending between the ears, a pivot between the outer ends of the ears and the outer end of the heel portion, a hook link pivotally mounted upon the intermediate portion of the locking lever adjacent the inner end of the heel portion and adapted to be swung into position over the ears and into position outwardly of the ears by the pivoting movement of said locking lever, said hook link having an opening in its side to permit a link of the tire chain to pass therethrough, said opening being situated in the hook link with respect to the ears whereby in the closed position the opening will be blocked by such ears to avoid the escape of said link of the tire chain in the event of too loose an application of the tire chain to the tire.

2. In an anti-skid tire chain comprising, a saddle plate adapted to fit across the felly and having out-turned arms adapted to lie against the opposite edges of the felly, and a tire chain pivotally connected to one of said arms and adapted to engage about a tire on the felly, means for connecting the free end of the tire chain to the saddle plate comprising outwardly extending elongated ears on the other of said arms, a locking lever having an angle heel portion extending between the ears, a pivot between the outer ends of the ears and the outer end of the heel portion, a hook link pivotally mounted upon the intermediate portion of the locking lever adjacent the inner end of the heel portion and adapted to be swung into position over the ears and into position outwardly of the ears by the pivoting movement of said locking lever, said hook link having an opening in its side to permit a link of the tire chain to pass therethrough, said opening being situated in the hook link with respect to the ears whereby in the closed position the opening will be blocked by such ears to avoid the escape of said link of the tire chain in the event of too loose an application of the tire chain to the tire, and stop projections on the hook link co-operating with said lever to avoid such movement of the hook link in the lever as would allow the opening to get below the ears in the closed position of the parts.

In testimony whereof, I have affixed my signature.

ALEXIS F. GILLET.